W. M. MELMORE.
MEANS FOR PROPELLING BICYCLES.
APPLICATION FILED NOV. 6, 1915.

1,174,335.

Patented Mar. 7, 1916.
2 SHEETS—SHEET 1.

W. M. MELMORE.
MEANS FOR PROPELLING BICYCLES.
APPLICATION FILED NOV. 6, 1915.
1,174,335.
Patented Mar. 7, 1916.
2 SHEETS—SHEET 2.
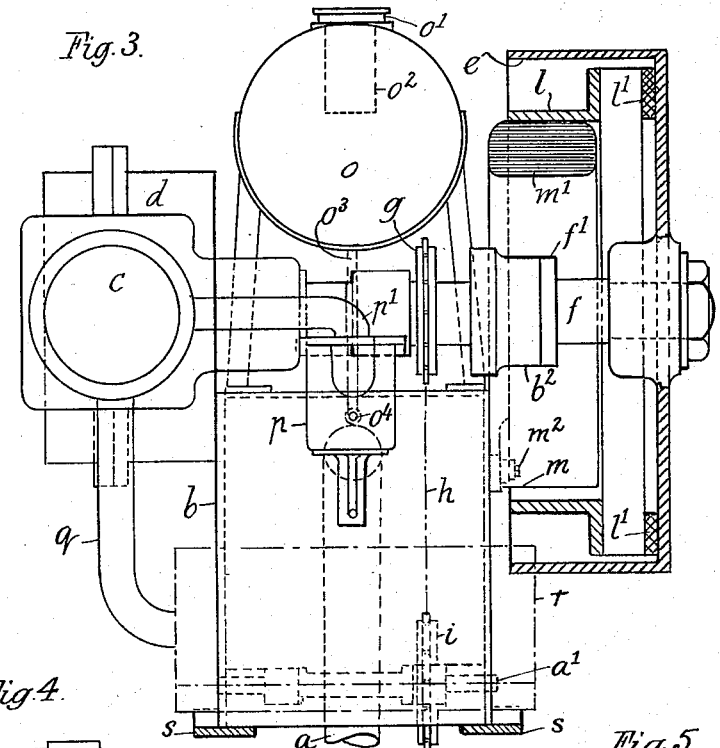
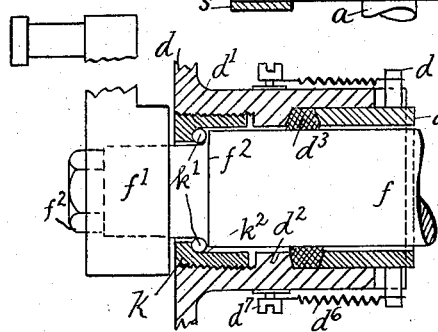
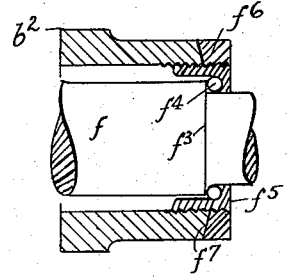
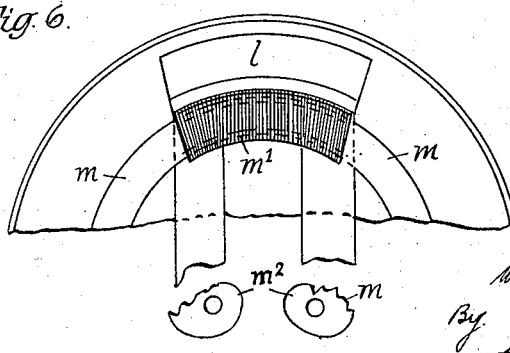

UNITED STATES PATENT OFFICE.

WILLIAM MORTIMER MELMORE, OF LONDON, ENGLAND.

MEANS FOR PROPELLING BICYCLES.

1,174,335. Specification of Letters Patent. Patented Mar. 7, 1916.

Application filed November 6, 1915. Serial No. 60,162.

*To all whom it may concern:*

Be it known that I, WILLIAM MORTIMER MELMORE, a subject of the King of England, residing at London, in the Kingdom of England, have invented new and useful Means for Propelling Bicycles, of which the following is a specification.

This invention relates to auxiliary driving motors for bicycles and has for its object to provide an improved means for propelling or pushing and driving bicycles from the rear.

According to a previously proposed arrangement a motor-tractor is attached to the outer side of the driving wheel of a bicycle so as to assist, by traction or pulling, in the driving of the cycle. With this arrangement it is necessary to adopt articulated attachment members which will not interfere with the steering and inclination characteristics of the bicycle and which will constrain the driving wheel of the cycle and the contiguous auxiliary motor wheel to remain in parallelism while allowing independent up and down movement of the latter wheel.

It has previously been proposed to attach a one wheeled motor to the rear of bicycles or tricycles by a kind of knuckle joint or articulated fulcrum pin.

By my improved arrangement of propelling or pushing bicycles tandemwise from the rear by a force or power directed in a straight line with the wheels or frame of the cycle through the intervention of simple flexible attachment members, I am enabled to preserve the advantages of a single track with inherent facility of steering and to adopt a very simple construction of motor.

For successfully carrying out my invention I require a balanced or straddle motor in combination with a carrier or propeller wheel of any suitable diameter as well as frame extensions or attachment members of a nature which at one and the same time will provide vertical springiness and lateral and longitudinal rigidity for the propeller wheel such as is obtained from two flat steel arms or bars suitably connected to the frame of the bicycle.

Figure 1:
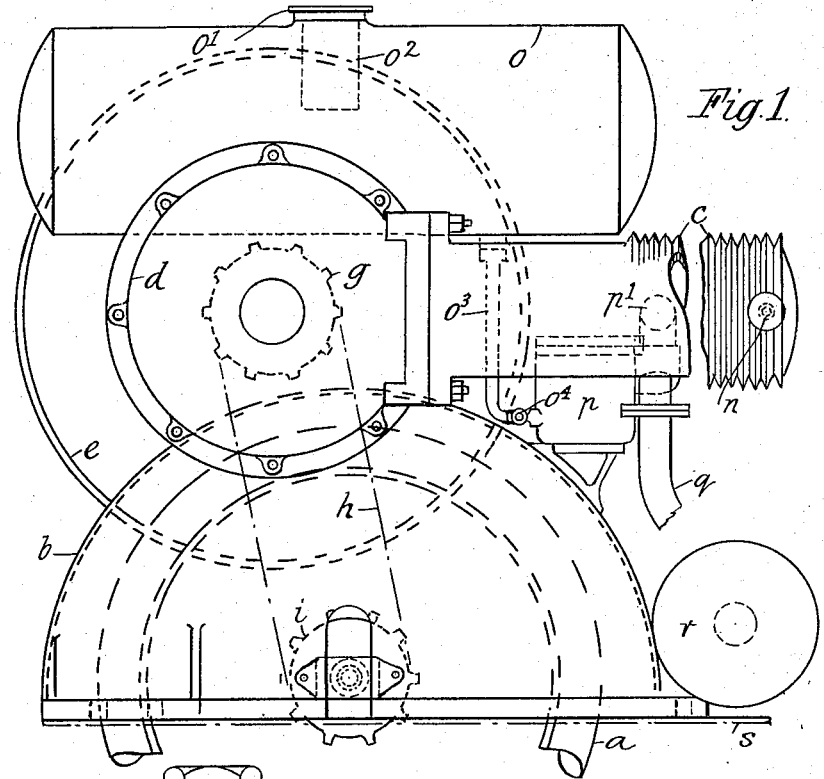
Figure 2:
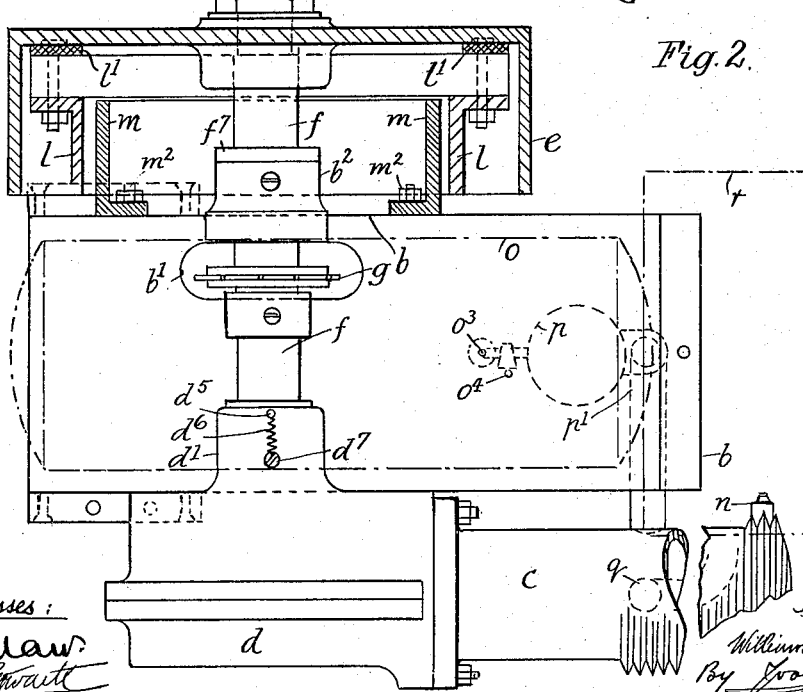

The accompanying drawings show at:—Figure 1 a side elevation of the propelling apparatus; Fig. 2 a plan of the same, the flywheel being shown in section; Fig. 3 a sectional end-view corresponding to Fig. 2; Figs. 4 and 5 enlarged views of constructional details; and Fig. 6 a face view of the flywheel showing the magneto attachment.

A road wheel $a$ of suitable size is provided with a hood or guard $b$ upon the top of which a horizontally disposed overhanging motor is mounted. To insure compactness for the apparatus, I dispose the cylinder $c$ and the crank-chamber $d$ so as to overlap at one side of the hood $b$, while the flywheel $e$ is arranged at the opposite side so as practically to balance each other. However, the motor may be arranged upon the hood in any other manner. The crankshaft $f$, which passes across the top of the hood $b$, is fitted with a chainwheel $g$ from which a driving chain $h$ leads through an aperture $b^1$, in the hood $b$, to a chainwheel $i$ fast on the axle $a^1$ of the roadwheel $a$.

As it is necessary to provide a gas-tight joint for the shaft $f$ in the boss $d^1$ of the crank-chamber, I use a removable crank $f^1$ tightened on the inner end of the shaft $f$ by a nut $f^2$. A race-ring $k$ is screwed in the boss $d^1$ to maintain the balls $k^1$ in position against a shoulder $f^2$ of the shaft $f$. An internal ring $d^2$ forms a seat for suitable packing material $d^3$ which is retained by a gland $d^4$. The gland may be tightened in any ordinary manner, or it may be fitted with two pins $d^5$ to engage springs $d^6$ fixed by screws $d^7$, to the boss $d^1$, see Fig. 4. A second ball-bearing such as $b^2$, for the shaft $f$ is provided on the hood $b$ opposite the boss $d^1$. The shaft $f$ is shouldered at $f^3$ to form a seating for balls $f^4$ which are retained by a race-ring $f^5$ secured in the internally screw-threaded bearing $b^2$ and prevented from unintentional unscrewing by an externally applied screw-ring $f^6$, the joint being made with slanting facings, whereby a strong gripping and locking action is produced on the ring $f^5$, see Fig. 5.

The flywheel $e$ is of a known type having a one-sided hub and a hollow rim for the placement of a low tension magneto. For instance an internal permanent magnet $l$ can be bolted with intermediate insulating pieces $l^1$ to the inner face of the flywheel. The magnet $l$ is carried with the wheel $e$ around a stationary C-shaped armature $m$ provided with a coil $m^1$, said armature being fixed by screws $m^2$ to the stationary hood $b$. One end of the coil is electrically connected with the ignition plug $n$ and the other end of the same is earthed. Low tension current is generated when the magnet $l$ cuts across the coil $m^1$ as is usual in such systems. A make and break contact or interrupter of known form (not shown) is provided in the electrical circuit in the usual manner.

Above the hood $b$ is a petrol tank $o$ mounted upon suitable brackets, $o^1$ being the filling cover furnished with a depending inverted cup $o^2$ for measuring a definite quantity of lubricating oil into the tank before filling same with petrol, according to known practice. A carbureter $p$ is supplied from the tank $o$ through a pipe $o^3$ and tap $o^4$ and delivers explosive mixture to the cylinder $c$ by an inlet pipe $p^1$. The exhaust pipe $q$ leads the gases of combustion to the silencer $r$.

To the lower edges of the hood $b$ are attached flexible steel bars $s$ which by their forward ends can be fixed to the rear fork or the frame of a bicycle and which allow springiness without lateral play to the propelling apparatus.

I claim:—

1. A propelling attachment for bicycles comprising an auxiliary traction wheel, a hood covering said wheel, an engine mounted upon said hood, means for driving said traction wheel from said engine and means for attaching said hood to the frame of a bicycle in such manner that said traction wheel is mounted in longitudinal alinement with the wheels of the bicycle.

2. A propelling attachment for bicycles, comprising an auxiliary traction wheel, a hood covering said wheel, an engine mounted upon said hood and having its cylinder disposed to one side of said hood and its fly wheel disposed to the other side of said hood, means for driving said traction wheel from said engine and means for attaching said hood to the frame of a bicycle in such manner as to mount said traction wheel in longitudinal alinement with the wheels of the bicycle.

WILLIAM MORTIMER MELMORE.

Witnesses:
 H. C. PICTON-JONES,
 G. A. SMART.

Copies of this patent may be obtained for five cents each, by addressing the "Commissioner of Patents. Washington, D. C."